(No Model.)
P. SCHULZ.
COMB.
No. 581,040. Patented Apr. 20, 1897.
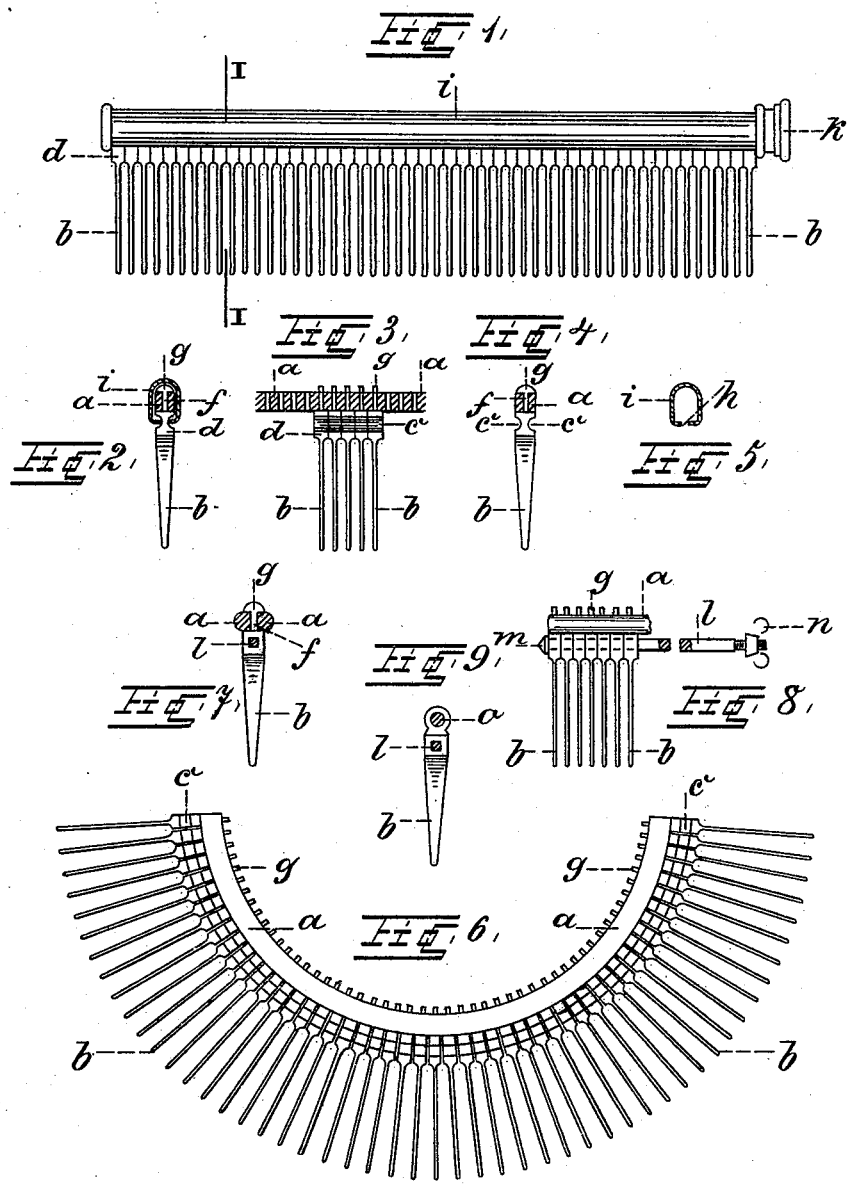
Witnesses
H. van Oldenneel
E. A. Scott
Inventor
Paul Schulz
by Reichardt
Attorneys

UNITED STATES PATENT OFFICE.

PAUL SCHULZ, OF BERLIN, GERMANY.

COMB.

SPECIFICATION forming part of Letters Patent No. 581,040, dated April 20, 1897.

Application filed June 10, 1896. Serial No. 595,063. (No model.)

*To all whom it may concern:*

Be it known that I, PAUL SCHULZ, a subject of the King of Prussia, Emperor of Germany, residing at Berlin, Germany, have invented certain new and useful Improvements in Elastic Combs, of which the following is a specification.

The object of this invention is a toilet comb the construction and arrangement of which are such that the teeth are readily accessible for cleaning purposes.

In the accompanying drawings, Figure 1 is a front view. Fig. 2 is a section on line I I of Fig. 1. Fig. 3 is part of a longitudinal section. Fig. 4 is a detail view of one tooth. Fig. 5 is a cross-section of the metal tube. Fig. 6 shows a view of the comb when spread out to clean the teeth. Figs. 7, 8, and 9 are detail views of modifications.

The comb consists, essentially, of a number of teeth $b$, embedded adjacently in an elastic strip $a$ and provided on both sides with a groove or indentation $c$, such teeth being thicker at the top $d$, so as to make up the spacing. The part of the teeth $f$, Figs. 2 and 4, which is embedded in the elastic strip is somewhat thinner and terminates at the top in a head $g$, so that the teeth may be firmly held in position.

To impart the necessary rigidity to the comb, a metal tube $i$, having a slot extending along its under side from end to end, is placed over the teeth $b$, so as to enter the grooves $c$, whereby the said teeth are firmly clamped and cannot move crosswise. To likewise secure the comb in a longitudinal direction, the tube $i$ is closed at one end, while the other end is furnished with a screw-thread whereon a nut $k$ is mounted, so that by tightening the latter the teeth are pressed together in a longitudinal direction.

When the comb requires cleaning, the nut $k$ is removed from the tube $i$, which is pulled off from the teeth $b$ and the elastic strip $a$, leaving the strip with the teeth, which can now be spread out by reason of the resiliency of the elastic strip, so that each tooth can be conveniently cleaned with a cloth or otherwise, Fig. 6.

Figs. 7, 8, and 9 show modifications of the above-described arrangement. In Figs. 7 and 8 the teeth $b$ of the comb are likewise embedded in an elastic strip $a$, but a bar $l$ is inserted below the latter in a square hole formed throughout the teeth and carries a head $m$ at one end, while the other end is screw-threaded and receives a butterfly-nut $n$, which is tightened, and thus consolidates the comb. In Fig. 9, instead of the elastic strip $a$, a rod $o$, provided with rivet-heads at each end, is passed throughout the teeth $b$, while below the same a square bar $l$ is likewise inserted throughout the same teeth, so that when the nut $n$ is tightened the teeth of the comb are fixed in position by the two rods. To clean the teeth in this last arrangement, the bar $b$ is removed, when each tooth can be turned about the rod $o$ for cleaning purposes.

The elastic strip may be of rubber or other suitable material which will bend readily without breaking.

Having now particularly described and ascertained the nature of my said invention and in what manner the same is to be performed, I declare that what I claim is—

1. A comb comprising a strip of elastic material carrying independent teeth and adapted to permit the spreading of said teeth into divergent or radial form and a second strip of rigid material engaging the teeth to hold them and the strip rigidly in place, said second strip detachably engaging the teeth substantially as described.

2. In combination, a tooth-carrying strip, a series of independent teeth carried thereby and arranged to be separated from each other by moving them to stand radially in relation to each other while maintaining their connection with the carrying-strip and a second strip engaging the teeth detachably, substantially as described.

In witness whereof I have hereunto set my hand in presence of two witnesses.

PAUL SCHULZ.

Witnesses:
W. HAUPT,
H. W. BÜTZKE.